United States Patent
Taruki (10) Patent No.: US 10,260,773 B2
(45) Date of Patent: Apr. 16, 2019

(54) AIR CONDITIONER

(71) Applicant: DAIKIN INDUSTRIES, LTD., Osaka-shi, Osaka (JP)

(72) Inventor: Yuusuke Taruki, Osaka (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 0 days.

(21) Appl. No.: 15/749,296

(22) PCT Filed: Oct. 4, 2016

(86) PCT No.: PCT/JP2016/079431
§ 371 (c)(1),
(2) Date: Jan. 31, 2018

(87) PCT Pub. No.: WO2017/073260
PCT Pub. Date: May 4, 2017

(65) Prior Publication Data
US 2018/0224154 A1    Aug. 9, 2018

(30) Foreign Application Priority Data

Oct. 27, 2015   (JP) ................. 2015-211144

(51) Int. Cl.
*F24F 13/24*   (2006.01)
*F24F 13/20*   (2006.01)
(Continued)

(52) U.S. Cl.
CPC .............. *F24F 13/24* (2013.01); *B32B 5/022* (2013.01); *B32B 5/18* (2013.01); *B32B 27/065* (2013.01);
(Continued)

(58) Field of Classification Search
CPC .......... F24F 13/24; F24F 13/20; F24F 13/222; F24F 13/075; F24F 1/0018; F16L 59/02
See application file for complete search history.

(56) References Cited

U.S. PATENT DOCUMENTS

| 6,374,483 | B1* | 4/2002 | Lee | ............ B23P 21/004 29/33 P |
| 2016/0025357 | A1* | 1/2016 | Suzuki | ............ F24F 13/20 165/121 |
| 2016/0033161 | A1* | 2/2016 | Koyanagi | ............ F24F 1/0007 312/236 |

FOREIGN PATENT DOCUMENTS

| JP | 56-68736 A | 6/1981 |
| JP | 11-6635 A | 1/1999 |

(Continued)

OTHER PUBLICATIONS

International Search Report issued in PCT/JP2016/079431 (PCT/ISA/210), dated Dec. 6, 2016.

*Primary Examiner* — Emmanuel Duke
(74) *Attorney, Agent, or Firm* — Birch, Stewart, Kolasch & Birch, LLP (57) ABSTRACT

An air conditioner has a first foam insulation member disposed on a side of an outlet passage formation portion and a first drain pan opposite from cold air or a heat exchanger, adjacent to which the outlet passage formation portion and first drain pan are disposed. The first foam insulation member has a hardened layer made of a material identical to a material of a foam insulation member body at a portion contacting the outlet passage formation portion and a portion contacting the first drain pan. The present invention thereby provides an air conditioner capable of reducing squeaks at low cost with a simple configuration.

7 Claims, 5 Drawing Sheets

(51) Int. Cl.
*F24F 13/22* (2006.01)
*B32B 5/02* (2006.01)
*B32B 5/18* (2006.01)
*B32B 27/06* (2006.01)
*F24F 13/02* (2006.01)

(52) U.S. Cl.
CPC .......... *F24F 13/0263* (2013.01); *F24F 13/20* (2013.01); *F24F 13/22* (2013.01); *F24F 13/222* (2013.01); *B32B 2307/304* (2013.01); *B32B 2307/536* (2013.01); *B32B 2307/746* (2013.01); *F24F 2013/227* (2013.01)

(56) References Cited

FOREIGN PATENT DOCUMENTS

| | | | |
|---|---|---|---|
| JP | 2003-74898 | A | 3/2003 |
| JP | 2008-12671 | A | 1/2008 |
| JP | 6070805 | B1 | 2/2017 |

* cited by examiner

Fig.1

LEFT ← → RIGHT

AIR CONDITIONER

TECHNICAL FIELD

The present invention relates to air conditioners.

BACKGROUND ART

There is a conventional air conditioner in which a scroll-shaped foam insulation member is fitted to a body casing (see, for example, JP H11-6635 A (Patent Literature 1)).

CITATIONS LIST

Patent Literature

Patent Literature 1: JP H11-6635 A

SUMMARY OF INVENTION

Technical Problem

In the above air conditioner, the coefficient of friction between the body casing, which is a resin molded product, and the foam insulation member is high, which thus causes a problem of squeaks generated at contact portions between the body casing and the foam insulation member.

In order to solve this problem, in a conventional air conditioner, a nonwoven fabric is stuck or a surfactant is applied between a resin member and a foam insulation member to reduce the coefficient of friction between the resin member and the foam insulation member.

However, the sticking of a nonwoven fabric or the application of a surfactant increases material cost and work man-hours, thus causing a problem of increased cost.

It is therefore an object of the present invention to provide air conditioners capable of reducing squeaks at low cost with a simple configuration.

Solution to Problem

There is provided, according to the present invention, an air conditioner comprising:
a resin member adjacent to at least one of cold air or a cold section; and
a foam insulation member opposing said at least one of the cold air or the cold section across the resin member,
wherein
the foam insulation member has a hardened layer made of a material identical to a material of a foam insulation member body at at least a portion contacting the resin member.

The resin member is a member made of a resin having no air bubbles inside or a resin having few air bubbles inside, unlike a porous foam insulation member containing innumerable fine air bubbles inside.

In the above configuration, for the resin member disposed adjacent to at least cold air or a cold section, the foam insulation member is disposed on a side of the resin member opposite from the at least one of the cold air or the cold, and the foam insulation member is provided with a hardened layer made of a material identical to a material of the foam insulation member body at at least a portion contacting the resin member. This allows reduction of squeaks at low cost with a simple configuration without sticking a nonwoven fabric or applying a surfactant to the foam insulation member.

The hardened layer of the foam insulation member may be formed simultaneously with the molding of the foam insulation member body, or may be formed by heating and melting the surface of the foam insulation member body after molding the foam insulation member body.

In one embodiment, the resin member includes a passage formation member forming at least a part of an outlet passage downstream of a blowing fan through which the cold air flows, and the foam insulation member is disposed on a side of the passage formation member opposite from the outlet passage.

In this embodiment, for the passage formation member forming at least a part of the outlet passage downstream of the blowing fan through which cold air flows, the foam insulation member is disposed on a side of the passage formation member opposite from the outlet passage, whereby it is possible to insulate the passage formation member exposed to the cold air, while preventing the generation of squeaks at the passage formation member when the passage formation member contracts by the cold air or expands while returning to room temperature.

In one embodiment, the resin member includes a drain pan disposed on a lower side of a heat exchanger as the cold section, and the foam insulation member is disposed on a lower side of the drain pan such that the hardened layer contacts a lower surface of the drain pan.

In this embodiment, by disposing the foam insulation member on the lower side of the drain pan disposed on the lower side of the heat exchanger as the cold section, it is possible to insulate the drain pan exposed to cold air, while preventing the generation of squeaks at contact portions between the drain pan and the foam insulation member when the drain pan contracts by cooling with drain water from the heat exchanger or with the cold air or expands while returning to room temperature.

In one embodiment, the hardened layer comprises a hardened layer formed on a front side of the foam insulation member facing the resin member and a hardened layer formed on a rear side of the foam insulation member opposite to the resin member.

In this embodiment, the hardened layer on the front side of the foam insulation member facing the resin member prevents generation of squeaks at the resin member. At the same time, since a hardened layer is also formed on the rear side of the foam insulation member, it is possible to sandwich and hold the foam insulation member from both its front and rear sides between the resin member and a further resin member, while preventing the generation of squeaks at contact portions between the foam insulation member and the resin members at both the front and the rear of the foam insulation member.

In one embodiment, the air conditioner further includes a holding member disposed on a side of the foam insulation member opposite from the resin member, wherein the foam insulation member is fixed by being sandwiched between the resin member and the holding member.

In this embodiment, since the foam insulation member is fixed by being sandwiched between the resin member and the holding member, the foam insulation member is held securely without using screws or the like.

In one embodiment, the hardened layer of the foam insulation member has a thickness of 1 μm or more and 2.0 mm or less.

In this embodiment, by setting the thickness of the hardened layer of the foam insulation member to 1 μm or more and 2.0 mm or less, the thickness of the hardened layer can be set according to the configuration of the resin member or the like, without degrading heat insulating properties. By using such a foam insulation member, the degree of freedom in designing the air conditioner can be increased. A hardened layer having a thickness of less than 1 μm is difficult to form, whereas a hardened layer having a thickness exceeding 2.0 mm results in an increase in material cost, and can be replaced with, for example, a resin molded product produced by injection molding.

In one embodiment, the foam insulation member is made of one material selected from polypropylene, polyethylene, and polystyrene, or a mixture of at least two materials selected from polypropylene, polyethylene, and polystyrene.

In this embodiment, by using one material selected from polypropylene, polyethylene, and polystyrene, or a mixture of at least two materials selected from polypropylene, polyethylene, and polystyrene, a foam insulation member that is easy to foam-mold and has excellent heat insulating properties is obtained.

Advantageous Effects of Invention

As apparent from the above, according to this invention, for a resin member disposed adjacent to at least cold air or a cold section, a foam insulation member is disposed on a side of the resin member opposite from the at least one of the cold air or the cold, and the foam insulation member is provided with a hardened layer made of a material identical to a material of a foam insulation member body at at least a portion contacting the resin member. This allows realization of air conditioners capable of reducing squeaks at low cost with a simple configuration.

DESCRIPTION OF EMBODIMENTS

Hereinafter, an air conditioner of the present invention will be described in detail with reference to an embodiment shown in the drawings. In the following description, the terms expressing orientations or directions, such as "above," "upper," "below," "lower," "right," "left," and derivatives thereof, are used in describing a configuration shown in the drawings. The purpose of using those terms is to facilitate the understanding of the embodiment through the drawings. Thus, those terms do not necessarily indicate the directions when the embodiment of the present invention is actually used, and the technical scope of the present invention should not be interpreted in a limited way by those terms.

Figure 1:
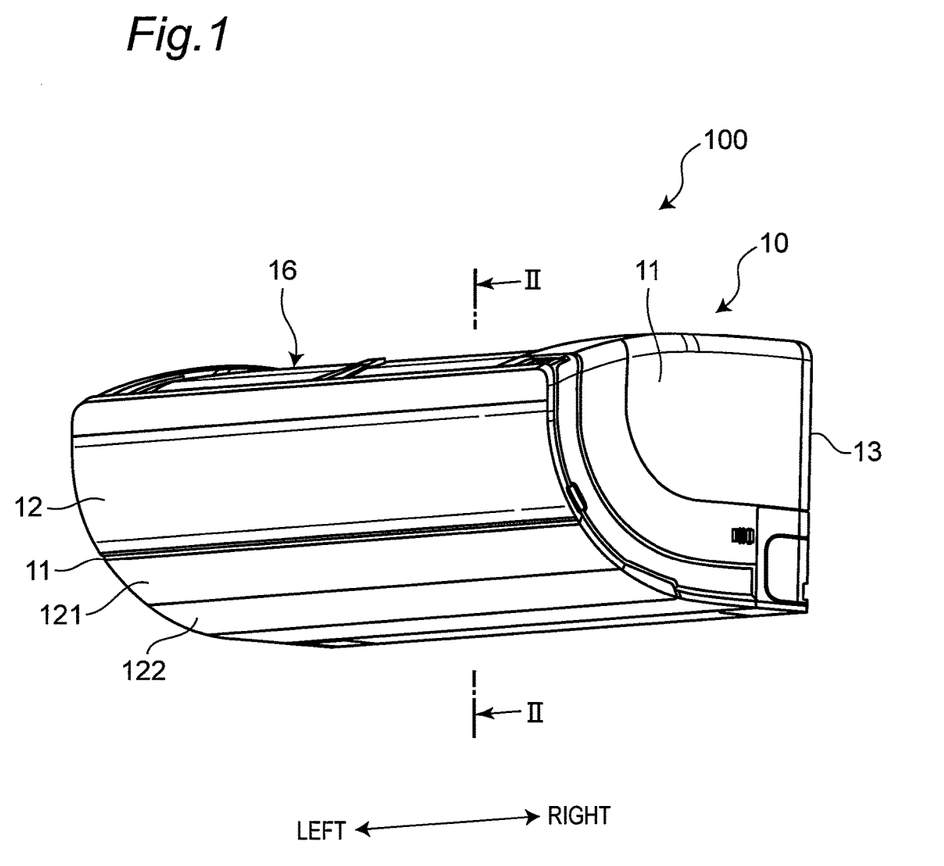
FIG. 1 is a perspective view of an air conditioner according to an embodiment of the present invention.
Figure 2:
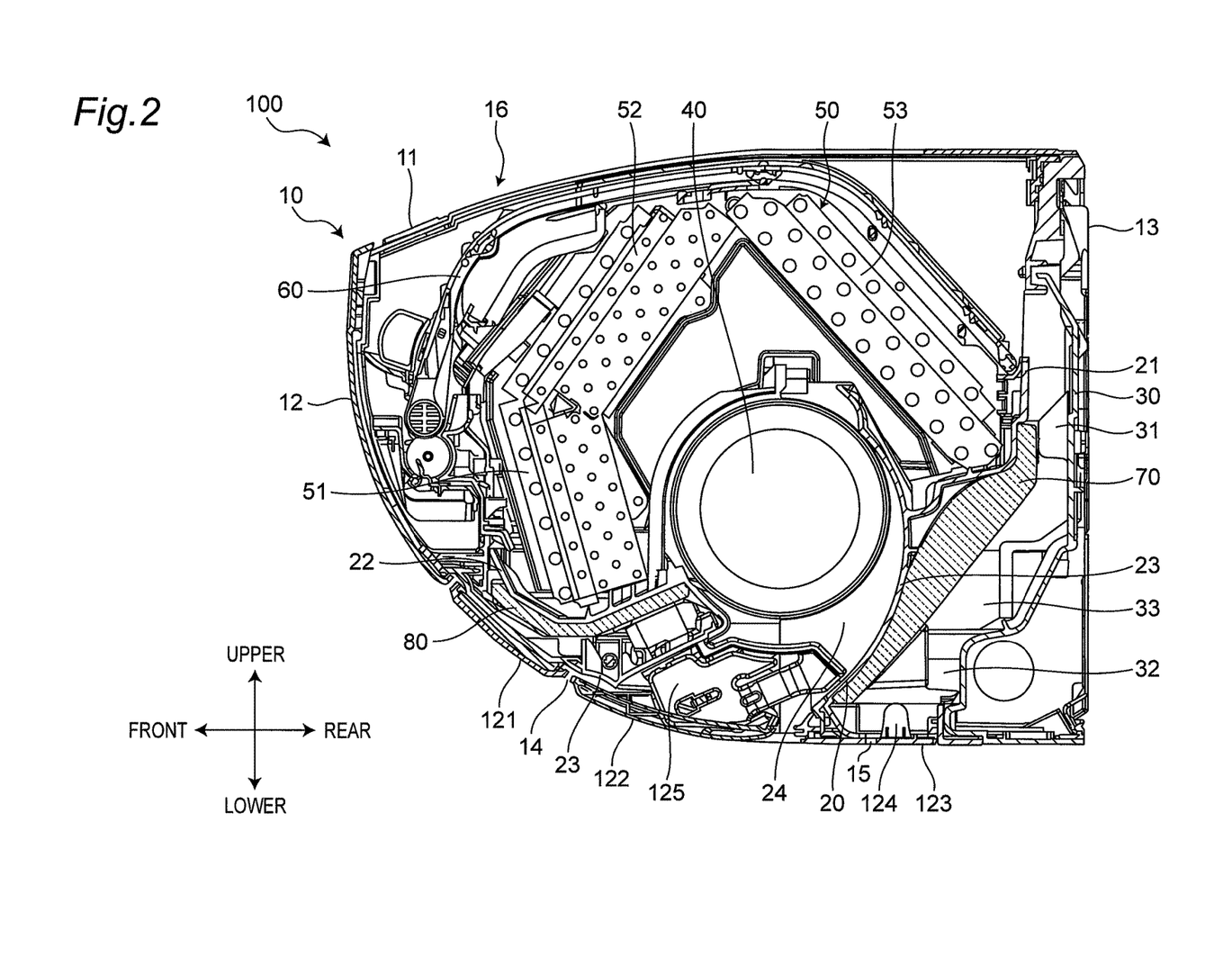
FIG. 2 is a vertical cross-sectional view as viewed from line II-II in FIG. 1.

FIG. 1 shows a perspective view of an air conditioner 100 according to an embodiment of the present invention. FIG. 2 shows a vertical cross-sectional view of the air conditioner 100 as viewed from line II-II in FIG. 1. The air conditioner 100 is of a wall-mounted type, and is connected to an outdoor unit (not shown) installed outdoors via a refrigerant pipe (not shown).

As shown in FIG. 1, the air conditioner 100 in the present embodiment includes a body casing 10, an upper inlet 16 provided on the upper side of the body casing 10, an outlet 14 (shown in FIG. 2) provided on the front side of the body casing 10, two horizontal flaps 121 and 122 juxtaposed in a forward and rearward direction at the outlet 14, and a plurality of vertical flaps 125 (shown in FIG. 2) spaced laterally at the outlet 14. The body casing 10 has a front grille 11, a front panel 12, and a mounting plate 13.

As shown in FIG. 2, the air conditioner 100 includes the body casing 10 and first and second frames 20 and 30 provided inside the body casing 10.

In a space formed by the body casing 10 and the first frame 20, a blowing fan 40 disposed substantially at the center, a heat exchanger 50 disposed forward of and above the blowing fan 40, and a filter 60 disposed in the body casing 10 and upstream of the heat exchanger 50 are provided. The heat exchanger 50 is an example of a cold section.

The front panel 12 of the body casing 10 is disposed so as to cover the front side of the front grille 11, and is rotatably supported on the front grille 11 at the upper-side edge of the front panel 12. The mounting plate 13 is disposed on the rear side of the front grille 11.

The body casing 10 is mounted to a wall surface (not shown) via the mounting plate 13.

A lower inlet 15 disposed on the rear side of the outlet 14 is provided in a lower surface of the body casing 10. The upper inlet 16 is provided in an upper surface of the body casing 10.

The horizontal flaps 121 and 122 provided at the outlet 14 are rotatably mounted to the front panel 12. The horizontal flap 122 opens and closes the outlet 14, and can vertically adjust the wind direction of air blown out from the outlet 14.

The plurality of vertical flaps 125 provided at the outlet 14 are rotatably mounted to the front panel 12, and can laterally adjust the wind direction of air blown out from the outlet 14.

Further, the lower inlet 15 is provided with a shutter 123 for opening and closing the lower inlet 15, and a driving mechanism 124 for driving the shutter 123.

The first frame 20 is made of resin, and is disposed so as to cover the lower side and the rear side of the blowing fan 40 and of the heat exchanger 50, as shown in FIG. 2. The first frame 20 has a first drain pan 21 and a second drain pan 22. The first drain pan 21 is disposed below the rear side (a third heat exchanger 53) of the heat exchanger 50, and the second drain pan 22 is disposed below the front side (a first heat exchanger 51) of the heat exchanger 50. The first and second drain pans 21 and 22 are configured to receive drain water dripping from the heat exchanger 50. The first and second drain pans 21 and 22 adjacent to the heat exchanger 50 are an example of a resin member. The resin member as used herein is a member made of a resin having no air bubbles inside or a resin having few air bubbles inside, unlike a porous foam insulation member containing innumerable fine air bubbles inside.

The first frame 20 also has, between the first and second drain pans 21 and 22, an outlet passage formation portion 23 that forms or defines a part (the rear side) of an outlet passage 24 downstream of the blowing fan 40. The outlet passage formation portion 23 is an example of a passage formation member included in the resin member. The outlet passage 24 connects the space where the blowing fan 40 is disposed inside the body casing 10 and the external space of the body casing 10 via the outlet 14.

Further, a first foam insulation member 70 is disposed on the lower side of the first drain pan 21 and on a rear surface of the outlet passage formation portion 23 of the first frame 20.

Moreover, a second foam insulation member 80 is disposed on a lower surface of the second drain pan 22 of the first frame 20.

As shown in FIG. 2, the second frame 30 has two protruding portions 31 and 32 spaced vertically, and is disposed rearward of the first frame 20 and forward of the mounting plate 13 of the body casing 10. The second frame 30 having the two protruding portions 31 and 32 is an example of a holding member.

Between the second frame 30 and the first frame 20, a lower inlet passage 33 is provided for connecting a rearward space of the heat exchanger 50 inside the body casing 10 and the external space of the body casing 10 via the lower inlet 15.

As shown in FIG. 2, the blowing fan 40 is mounted to the first frame 20. When the blowing fan 40 is driven by a fan motor (not shown), air outside the body casing 10 is drawn into the body casing 10 from the lower inlet 15 and the upper inlet 16. The air drawn into the body casing 10 passes through the filter 60 and the heat exchanger 50, and then passes through the outlet passage 24 and is blown out from the outlet 14 to the outside of the body casing 10.

The heat exchanger 50 includes the first heat exchanger 51 disposed forward of the blowing fan 40, a second heat exchanger 52 disposed above the front side of the blowing fan 40, and the third heat exchanger 53 disposed above the rear side of the blowing fan 40.

The filter 60 removes dust contained in air drawn into the body casing 10 from the lower inlet 15 and the upper inlet 16 before the air passes through the heat exchanger 50.

Next, the first and second foam insulation members 70 and 80 disposed on the first frame 20 will be described in detail.

The first and second foam insulation members 70 and 80 are made of, for example, one material selected from polypropylene, polyethylene, and polystyrene, or a mixture of at least two materials selected from polypropylene, polyethylene, and polystyrene.

As shown in FIG. 2, the first foam insulation member 70 is sandwiched between the first drain pan 21 and outlet passage formation portion 23 of the first frame 20, and the protruding portions 31 and 32 of the second frame 30.

Figure 3:
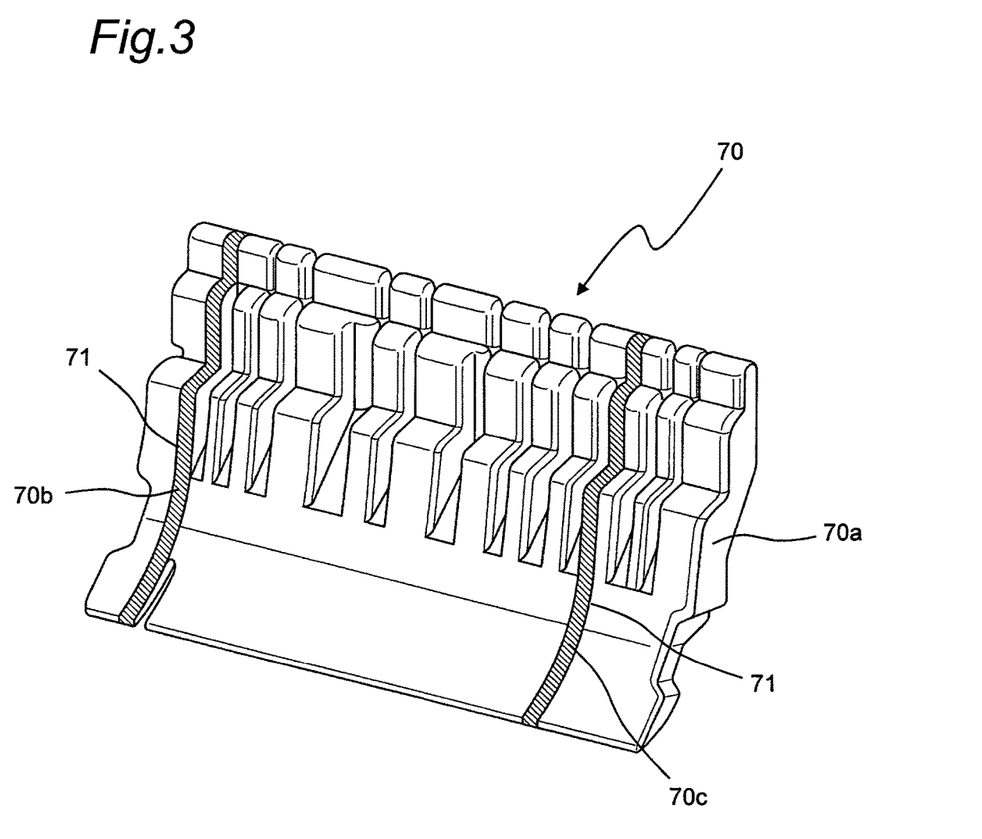
FIG. 3 is a perspective view of a front side of a first foam insulation member of the air conditioner as viewed from diagonally above.

FIG. 3 is a perspective view of the front side of the first foam insulation member 70 (the side facing the first drain pan 21 and the outlet passage formation portion 23 of the first frame 20) as viewed from diagonally above.

The first foam insulation member 70 has a foam insulation member body 70a and hardened layers 70b and 70c provided on the front side of the foam insulation member body 70a, which hardened layers 70b and 70c have a strip shape, are spaced from each other, and extend in a forward and rearward direction. The hardened layers 70b and 70c are made of a material identical to that of the foam insulation member body 70a. The hardened layers 70b and 70c are provided on surfaces of strip-shaped protrusions 71 and 71 formed integrally with the foam insulation member body 70a.

Figure 4:
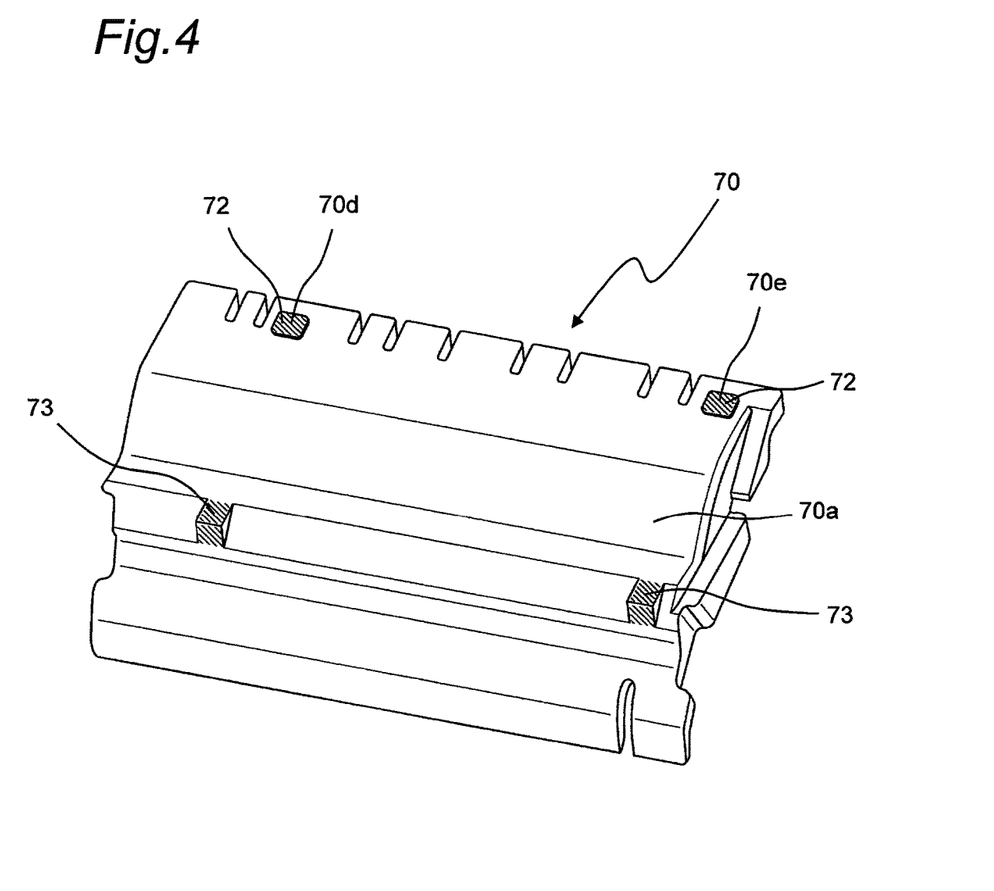
FIG. 4 is a perspective view of a back side of the first foam insulation member as viewed from diagonally below.

FIG. 4 is a perspective view of the rear side of the first foam insulation member 70 as viewed from diagonally below.

The first foam insulation member 70 has hardened layers 70d and 70e which have a rectangular shape and are spaced from each other, on the upper rear side of the foam insulation member body 70a. The hardened layers 70d and 70e are made of a material identical to that of the foam insulation member body 70a. The hardened layers 70d and 70e are provided on surfaces of protrusions 72 and 72 which have a rectangular shape and are formed integrally with the foam insulation member body 70a. The hardened layers 70d and 70e are in contact with the distal end of the protruding portion 31 of the second frame 30.

Further, protruding portions 73 and 73 are provided on the lower rear side of the foam insulation member body 70a, spaced from each other. As shown in an enlarged view of FIG. 5, the protruding portions 73 and 73 are each provided with a hardened layer 70f having a rectangular shape on an upper surface of the protruding portions 73 and 73, and are each provided with a hardened layer 70g having a rectangular shape on a lower surface of the protruding portions 73 and 73. The hardened layers 70f and 70g are in contact with the distal end of the protruding portions 73 and 73 of the second frame 30.

Figure 5:
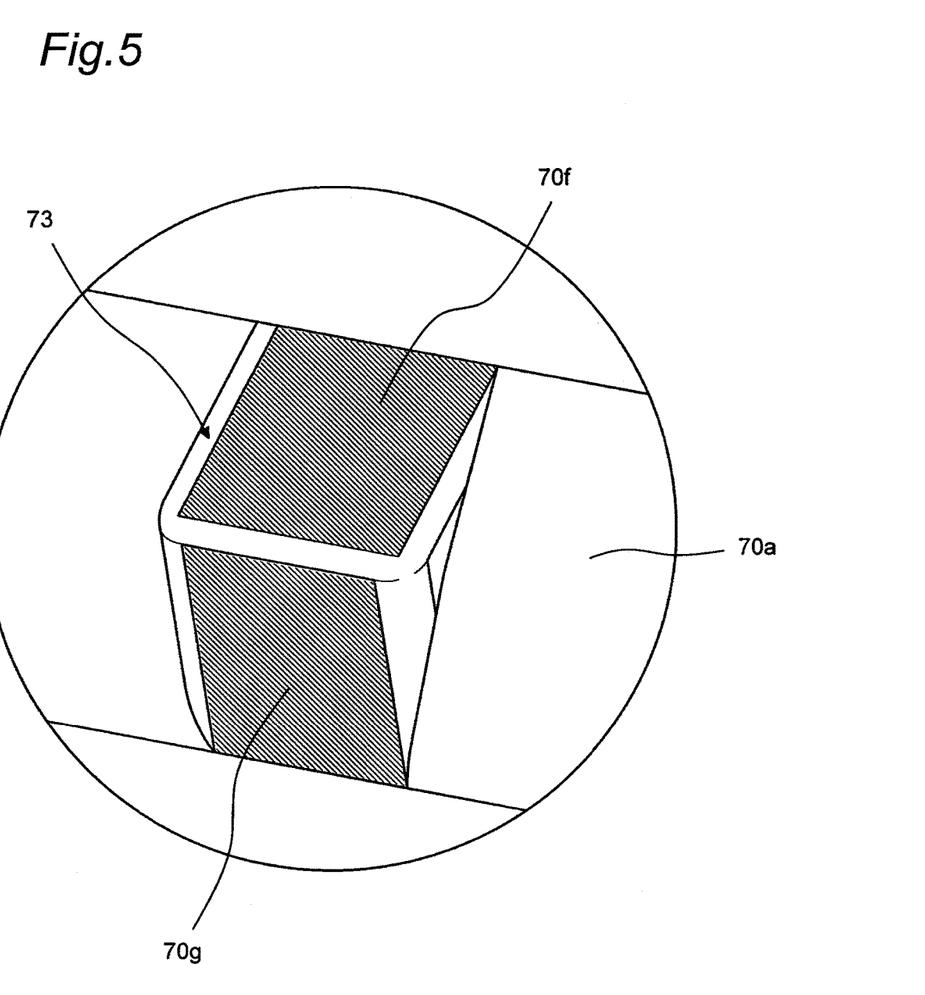
FIG. 5 is an enlarged view of a part shown in FIG. 4.

The hardened layers 70b to 70g of the first foam insulation member 70 are high-hardness layers having a lower foaming rate than the foam insulation member body 70a, and are formed with a thickness of 0.1 mm, for example. The hardened layers 70b to 70g of the first foam insulation member 70 are formed, for example, by melting the first foam insulation member 70 and then solidifying it.

As shown in FIG. 2, the second foam insulation member 80 is disposed so as to cover a lower surface 221 of the second drain pan 22. The second foam insulation member 80 is provided with a hardened layer (not shown) at a portion on the upper side of its foam insulation member body and in contact with the lower surface 221 of the second drain pan 22.

The hardened layer of the second foam insulation member 80 is a high-hardness layer having a lower foaming rate than the foam insulation member body, and is formed with a thickness of 0.1 mm, for example. The hardened layer of the second foam insulation member 80 is formed, for example, by melting a foam insulation member and then solidifying it.

As described above, in the air conditioner 100 with the above-described configuration, for the outlet passage formation portion 23 (resin member) adjacent to cold air flowing through the outlet passage 24 during cooling operation and the first drain pan 21 (resin member) adjacent to the heat exchanger 50 (cold section) that is cooled during the cooling operation, the hardened layers 70b and 70c made of the material identical to that of the foam insulation member body 70a are provided at portions in contact with the outlet passage formation portion 23 and portions in contact with the first drain pan 21 of the first foam insulation member 70 disposed on the rear side of the air conditioner 100.

Further, the hardened layer made of the material identical to that of the foam insulation member body is provided at a portion in contact with the second drain pan 22 of the second foam insulation member 80 disposed with the second drain pan 22 (resin member) interposed between the second foam insulation member 80 and the heat exchanger 50 (cold section) that is cooled during the cooling operation.

This can reduce squeaks at low cost with a simple configuration without sticking a nonwoven fabric or applying a surfactant to the first and second foam insulation members 70 and 80.

The present inventor performed an experiment based on Japanese Industrial Standards (JIS) K7125 with a foam insulation member made of expanded polystyrene (EPS) produced by foaming polystyrene mainly with a hydrocarbon gas such as butane or pentane, provided with hardened layers having a thickness of 0.1 mm. The result revealed that the static friction coefficient could be reduced by 12%, and the dynamic friction coefficient could be reduced by 11%.

In an evaluation test conducted by the present inventor using the air conditioner of the above configuration, by fitting the foam insulation member provided with the hardened layers of the present invention to the rear surface of the outlet passage formation portion, the degree of generation of squeaks could be reduced to 50% or less, as compared with the degree of generation of squeaks to be generated when a foam insulation member is fitted to the rear surface of the outlet passage formation portion using a nonwoven fabric and a surfactant.

The hardened layers of the foam insulation member as used herein may be formed simultaneously with the molding of the foam insulation member body, or may be formed by heating and melting the surface of the foam insulation member body after molding the foam insulation member body.

By disposing the first foam insulation member 70 on the rear side of the outlet passage formation portion 23 (passage formation member) forming a part of the outlet passage 24 downstream of the blowing fan 40 through which cold air flows, it is possible to insulate the outlet passage formation portion 23 exposed to cold air, while preventing the generation of squeaks at the outlet passage formation portion 23.

By disposing the first and second foam insulation members 70 and 80 on the lower sides of the first and second drain pans 21 and 22 disposed on the lower side of the heat exchanger 50 as the cold section, it is possible to insulate the first and second drain pans 21 and 22 exposed to cold air, while preventing the generation of squeaks at contact portions between the first and second drain pans 21 and 22 and the first and second foam insulation members 70 and 80 when the first and second drain pans 21 and 22 contract by cooling with drain water from the heat exchanger 50 or expand while returning to room temperature.

By forming the hardened layers 70b to 70g on both of the front side of the first foam insulation member 70 (the side facing the outlet passage formation portion 23 (resin member) and the first drain pan 21 (resin member)) and the rear side of the first foam insulation member 70 (the side opposite to the outlet passage formation portion 23 and the first drain pan 21), it is possible to prevent the generation of squeaks also at contact portions between the first foam insulation member 70 and the resin members at both the front and the back of the first foam insulation member 70 while sandwiching and holding the first foam insulation member 70 between the outlet passage formation portion 23 and the protruding portions 31 and 32 of the second frame 30.

Since the first foam insulation member 70 is fixed by being sandwiched between the outlet passage formation portion 23 (resin member) and the protruding portions 31 and 32 of the second frame 30 (holding member), the first foam insulation member 70 is held securely without using screws or the like.

By setting the thickness of the hardened layers of the first and second foam insulation members 70 and 80 to 1 μm or more and 2.0 mm or less, the thickness of the hardened layers can be set according to the configuration of the resin member or the like, without degrading heat insulating properties. By using such a foam insulation member, the degree of freedom in designing the air conditioner 100 can be increased. A hardened layer having a thickness of less than 1 μm is difficult to form, whereas a hardened layer having a thickness exceeding 2.0 mm results in an increase in material cost, and can be replaced with, for example, a resin molded product produced by injection molding.

By using one material selected from polypropylene, polyethylene, and polystyrene, or a mixture of at least two materials selected from polypropylene, polyethylene, and polystyrene for the first and second foam insulation members 70 and 80, a foam insulation member that is easy to foam-mold and has excellent heat insulating properties can be obtained.

Although the air conditioner 100 including the first and second foam insulation members 70 and 80 made of one material selected from polypropylene, polyethylene, polystyrene or a mixture of at least two materials selected from polypropylene, polyethylene, and polystyrene has been described in the above embodiment, the air conditioner 100 may alternatively include a foam insulation member made of another material.

Although the air conditioner 100 including the first and second foam insulation members 70 and 80 has been described in the above embodiment, the foam insulation member is not limited to these. The present invention is applicable to an air conditioner including a foam insulation member disposed on the opposite side of a resin member adjacent to cold air (and/or a cold section) from the cold air (and/or the cold section).

In the above embodiment, the hardened layers 70b to 70g are provided on the surfaces of the strip-shaped protrusions 71 and 71, the protrusions 72 and 72, and the protruding portions 73 and 73 integrally formed with the foam insulation member body 70a of the first foam insulation member 70. Alternatively, the hardened layers may be provided on a surface of the foam insulation member body. In this case, the distal end of protrusions provided at the resin member are brought into contact with the hardened layers of the foam insulation member.

Although the specific embodiment of the present invention has been described, the present invention is not limited to the above embodiment, and various modifications can be made within the scope of the present invention.

REFERENCE SIGNS LIST

10: body casing
11: front grille
12: front panel
13: mounting plate
14: outlet
15: lower inlet
20: first frame
21: first drain pan
22: second drain pan
23: outlet passage formation portion
24: outlet passage
30: second frame
31, 32: protruding portion
33: lower inlet passage
40: blowing fan
50: heat exchanger
51: first heat exchanger
52: second heat exchanger
53: third heat exchanger
60: filter
70: first foam insulation member
70a: foam insulation member body
70b to 70g: hardened layer
71, 71: strip-shaped protrusion
72, 72: protrusion 73, 73: protruding portion
80: second foam insulation member
100: air conditioner
121, 122: horizontal flap
123: shutter
124: driving mechanism
125: vertical flap

The invention claimed is:

1. An air conditioner comprising:
a resin member adjacent to at least one of cold air or a cold section; and
a foam insulation member opposing said at least one of the cold air or the cold section across the resin member,
wherein the foam insulation member has a hardened layer made of a material identical to a material of a foam insulation member body, the hardened layer being an integral part of the foam insulation member and being positioned at at least a portion of the foam insulation member contacting the resin member.

2. The air conditioner according to claim 1, wherein
the resin member includes a passage formation member forming at least a part of an outlet passage downstream of a blowing fan through which the cold air flows, and
the foam insulation member is disposed on a side of the passage formation member opposite from the outlet passage.

3. The air conditioner according to claim 1, wherein
the resin member includes a drain pan disposed on a lower side of a heat exchanger as the cold section, and
the foam insulation member is disposed on a lower side of the drain pan such that the hardened layer contacts a lower surface of the drain pan.

4. The air conditioner according to claim 1, wherein
the hardened layer comprises a hardened layer formed on a front side of the foam insulation member facing the resin member and a hardened layer formed on a rear side of the foam insulation member opposite to the resin member.

5. The air conditioner according to claim 4 further comprising:
a holding member disposed on a side of the foam insulation member opposite from the resin member,
wherein the foam insulation member is fixed by being sandwiched between the resin member and the holding member.

6. The air conditioner according to claim 1, wherein the hardened layer of the foam insulation member has a thickness of 1 µm or more and 2.0 mm or less.

7. The air conditioner according to claim 1, wherein the foam insulation member is made of one material selected from polypropylene, polyethylene, and polystyrene, or a mixture of at least two materials selected from polypropylene, polyethylene, and polystyrene.

* * * * *